May 20, 1958
B. S. WEAVER
2,835,286
CIRCULAR SAW BLADE
Filed June 15, 1956
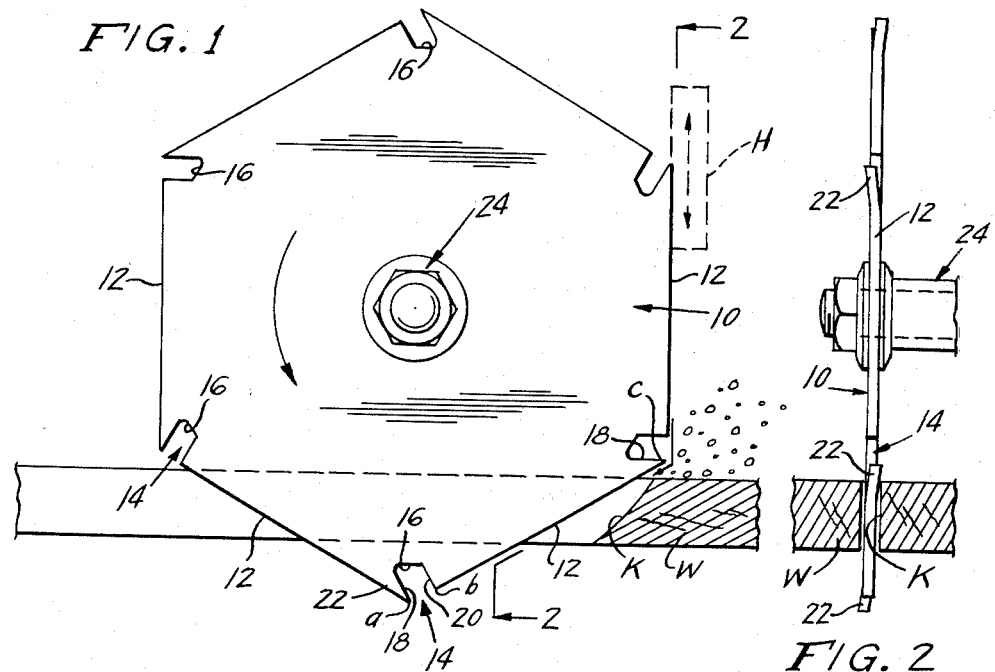
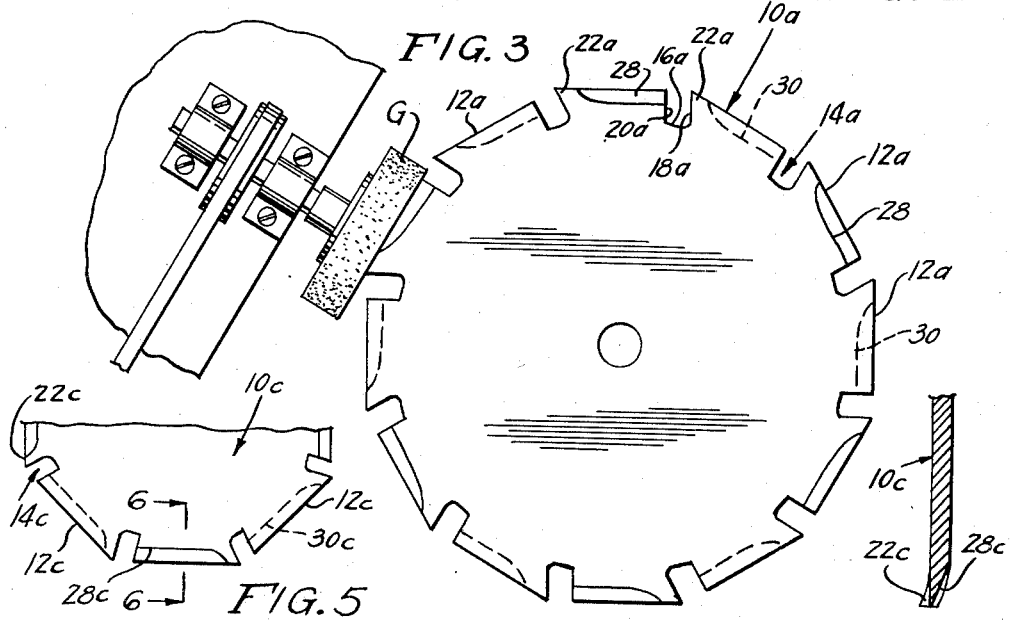
INVENTOR.
BERNARD S. WEAVER
BY
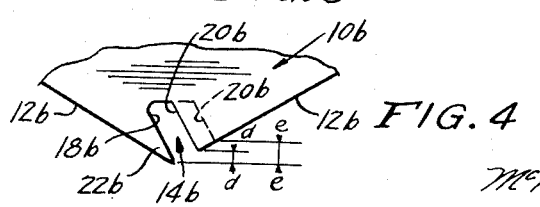
ATTORNEYS

United States Patent Office 2,835,286
Patented May 20, 1958

2,835,286

CIRCULAR SAW BLADE

Bernard S. Weaver, Shelby, Ohio

Application June 15, 1956, Serial No. 591,638

3 Claims. (Cl. 143—133)

The present invention relates to a saw blade of the rotary type, and more particularly has reference to a saw blade having gullet-type teeth:

One object of the invention is to provide a saw blade as described which will be particularly characterized by the ease with which the same may be sharpened, as compared to conventional circular saws.

Another object is to provide a saw blade as described so designed that, during sharpening, the periphery of the blade may be held against the flat face of an emery wheel or other abrasive device, with adjacent walls of adjacent teeth serving as a guide for properly locating said periphery relative to the wheel and vice versa.

Yet another object is to design the saw blade in such a manner that the cutting points or tips thereof may be honed or filed with marked facility as compared to circular blades heretofore devised, with said facility being accompanied by increased accuracy.

Still another object is to provide a saw blade so designed that the blanks used in forming the same may be cut from a sheet of material in a manner to reduce wastage to a minimum.

Still another object is to design the blade in such a manner that any saw dust will be thrown out immediately, even should it bypass the gullets of the teeth, thus reducing "drag" or friction between surfaces and the work to a minimum.

Still another object is to design the blade in such a manner that between the several gullets, the faces of the blade will be particularly shaped and arranged to plane or smooth the edges of the kerf formed in the work by the blade.

A further object of importance is to provide a blade as designed which, though simply constructed, will be of exceptional strength, through the provision of a solid backing area of substantial size behind each tooth.

A further object is to form the blade in such a manner that safety of operation will be enhanced, due to the particular formation and relative arrangement of the teeth, tending to cause the same from seizing the work or stalling in the same.

A further object is to design the toothed periphery of the blade in a manner that will facilitate regulation of the amount of work area to be disposed in the path of each tooth, with control of this factor being easily achieved by selective grinding of the slots or gullets.

Other objects will appear from the following description, the claims appended thereto, and from the annexed drawing, in which like reference characters designate like parts throughout the several views, and wherein:

Figure 1 is an elevational view of the blade as it appears when in use, a hone being shown in dotted lines at the periphery of the blade as it would appear when the blade is being filed;

Figure 2 is a view on line 2—2 of Figure 1, showing the blade in edge elevation;

Figure 3 is an elevational view of a modified form of blade, as it appears when being sharpened;

Figure 4 is a fragmentary elevational view of a third form of the blade;

Figure 5 is a fragmentary elevational view of a fourth form of the blade; and

Figure 6 is a detail sectional view, on an enlarged scale, on line 6—6 of Figure 5.

Referring to the drawings in detail, the reference numeral 10 generally designates a circular saw blade formed according to the present invention.

The blade, in all forms of the invention, has the outer configuration of a polygon. It may be hexagonal, septagonal, octagonal, or of various other polygonal shapes. In Figure 1, the blade is hexagonal, having six straight back edges 12 alternating with gullets 14.

The particular shape of the gullets, and the particular relative arrangement of the gullets and back edges, are of importance. Thus, each gullet has an inner edge 16, and all of said inner edges lie in a common circular path drawn about the blade center.

Each gullet also includes a trailing edge 18, the word trailing being used in the sense of direction of rotation of the saw blade when in use as shown by the arrow in Figure 1. The trailing edges 18 are each angular or oblique to a line drawn radially from the center of the saw blade and intersecting the trailing edge. The inclination is in a direction such that the outer ends of the trailing edges 18 are leading in respect to the inner ends of said trailing edges, in the sense of direction of rotation of the saw blade.

Each gullet 14 also includes a leading edge 20. This, like the trailing edge, is straight. The leading edge 20 is parallel to the trailing edge 18.

It is of importance that the outer end of the trailing edge of each gullet 18 falls upon the intersection point of the backing edge 12 next following the gullet in the sense of direction of rotation of the blade, and a straight line drawn in extension of the backing edge 12 next preceding said gullet. It is further of importance that trailing edge 18 of each gullet and backing edge 12 next following the gullet in the sense of direction of rotation of the blade, are at an acute angle to one another to form a forwardly pitched tooth 22 the point A of which is in line with points B, C, viewing the device in Figure 1. Point B is the intersection point between the leading edge 20 of the gullet and the backing edge 12 next preceding the gullet in the sense of direction of rotation of the blade. Point C is at the intersection point between the trailing edge 18 and the backing edge 12 of the gullet and backing edge, respectively, next preceding the first named gullet.

The teeth 22, as shown in Figure 2, may be slightly bent laterally out of the main plane of the saw blade, with each tooth being bent in a direction opposite to the direction in which the tooth next preceding the same was bent. It will be understood at this point that the terms "preceding" or "leading" and the terms "following" and "trailing" as herein used will always refer to the relative locations of components considering the sense of direction of rotation of the blade.

The blade is particularly characterized by the ease with which the same may be honed, filed, or sharpened. Thus, in Figure 1 there is shown a hone H, and this may be reciprocated in a straight line, in contact with any backing edge 12. When the hone is positioned as shown in Figure 1, the straight, elongated back edge 12 tends to maintain the hone in a rectilinear path of movement, facilitating sharpening. One might, if it is so desired, hone down the back edge 12 slightly at the location at which it intersects with the trailing edge 18 without loss of efficiency, so long as the point of the tooth 22 will still protrude outwardly far enough to properly seize the material being cut.

Further, a grinding wheel G, such as is shown in Figure 3, is used to advantage in sharpening the blade with maximum ease and speed. The flat face of the wheel can be positioned in direct, face-to-face contact with a selected backing edge 12, and on rotation of the grinding wheel, the backing edge 12 will be ground down as necessary, to sharpen the teeth 22. The particular formation and relative arrangement of each backing edge 12 and of the gullets immediately leading and immediately trailing the same, permit the grinding wheel to be accurately positioned with its marginal portion projecting beyond the opposite edges of the back edge being ground down, thus to readily locate the grinding wheel relative to the back edge being sharpened, and permit swift sharpening of the several back edges of the blade.

The blade is mountable on the usual arbor 24.

The work has been designated at W in Figure 2, and the kerf formed therein has been designated by the reference letter K. In use of the blade, the blade is rotated counter-clockwise in Figure 1, so that the stock may be shifted in a direction to the left in Figure 1, that is, in a direction opposite the direction of movement of the portion of the saw blade extending through the work. When the blade is rotated, each tooth takes a small bite of the stock, with the resulting saw dust or chips collecting in the gullet. The collected dust, disposed in front of the tooth, is carried through and out of the kerf and discarded by centrifugal action. The next following tooth is prevented from taking too deep a bite, by the trailing back edge 12 of the retreating tooth.

In Figure 3 there is shown a modified blade 10a, which is possessed of the same characteristics as the blade 10, except that while polygonal, it is not octagonal and has, instead, twelve back edges 12a, and twelve gullets 14a.

The inner edges 16a of the gullets fall on a circular path drawn about the center of the blade in the same manner as the edges 16. Further, the straight trailing and leading edges 18a, 20a respectively are parallel as in the first form of the invention, and are inclined similarly to the inclination of corresponding edges of the first form. Further, the teeth 22a may have a side rake, similar to that of the first form. This is intended to show the adaptability of the invention for manufacture in any desired polygonal shape, so long as the basic principles and structure are retained. Further, in Figure 3 the opposite faces of the saw blade are beveled as at 28, 30 respectively.

As may be noted, the beveled surfaces 28 are all on one face of the saw blade. The bevel extends fully to the backing edge 12a, begins at a location spaced rearwardly from the point of the tooth 22a, and follows a curving line that is bowed outwardly from the adjacent edge 12a, so that the surface beveled is progressively increased in area in a direction rearwardly from the immediately preceding teeth, up to a location near the next following tooth gullet, at which location the beveled surface begins to narrow slightly. The beveled surfaces 28 of one face of the blade alternate over the full circumference of the blade with the beveled surfaces 30 of the other face of the blade.

The beveled surfaces can be used on the form of Figure 1, and conversely, the beveled surfaces could be left off the form of Figure 3. In other words, the beveled surfaces can be used on any of the various polygonal shapes in which the blades can be formed, or alternatively, could be left off.

The beveled surfaces, when included in the blade, coact with the particular shape of the gullet and backing edges, in a manner such as to plane or smooth the opposite edges of the kerf K, reducing friction between the blade and the kerf walls to a minimum.

In Figure 4 there is shown another modification wherein the blade has been designated 10c. The blade has backing edges 12c similar to the backing edges 12, 12a, and has gullets 14c arranged similarly to those of the first forms of the invention, the gullet 14c having trailing and leading edges 18b, 20b parallel to and inclined similarly to the first form, with pointed teeth 22b being defined by the converging trailing and backing edges 18b, 20b respectively.

In this form of the invention, the gullet 14b is narrower than the gullets of the first form. This produces a "grab" of each tooth 22b upon the work less than that produced in the forms of Figures 1 and 3. The showing is intended to illustrate the adaptability of the saw blade design for regulating the amount of "grab" or seizure of the work by grinding of the saw gullet or slot 14b to an increased width. Thus, the gullet may initially be of a narrow width as shown in full lines in Figure 4 and the distance d—d between adjacent ends of adjacent backing edges 12b is so low that the preceding backing edge 12b is interposed as a direct guide means limiting to a substantial degree the penetration of the work by the point of the following tooth 22b. If it is desired to increase said penetration, the slot 14b is readily ground wider, so that the leading edge 20b thereof is now spaced, as shown in dotted lines in Figure 4, a greater distance from the trailing edge 18b. The distance between the adjacent ends of the adjacent backing edges 12b will now be shown at e—e, and will be increased to an extent such as to increase the penetration of the work by the tooth 22b.

In Figure 5 there is shown another modification 10c, in which, again, the blade can be of any desired polygonal configuration. The blade has a selected number of backing edges 12c alternating with gullets 14c, and the leading and trailing edges of the gullets, and the particular location of said edges relative to the backing edges, are as in the first form of the invention. In this form, beveled surfaces 28c, 30c on the opposite faces of the blade are alternated in a circumferential direction similarly to the beveled surfaces 28, 30 of Figure 3. However, although the beveled surfaces begin at a location rearwardly of the point of each tooth 22c, and are progressively increased in width in a rearward direction in respect to said tooth 22c, they reach a point of maximum width at a location close to the leading ends of the beveled surfaces, and thereafter are of constant width fully to the rear ends of the beveled surfaces. This arrangement may be employed instead of the arrangement shown in Figure 3.

In all forms of the invention, the blade has the desirable characteristic of being capable of sharpening with maximum speed and ease, with a high degree of accuracy and sharpening being achieved despite the absence of precision tools, and, perhaps, the relative lack of skill of the worker.

Further, the blade has an efficient functional characteristic when cutting through the work, permitting rapid and easy cutting. Still further, a strong support is provided for each tooth 22c, since the tooth is followed by a relatively elongated backing surface following along the backing edge 12 that cooperates in forming said tooth.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A gullet-type circular saw blade of polygonal configuration having gullets alternating with straight back edges, each gullet having a trailing edge angular to the next following back edge and extending into convergence with the next following back edge, at the point of intersection of said next following back edge with a straight line drawn in extension of the next preceding back edge, each trailing edge being angular to a line intersecting the same and drawn radially from the center of the blade, the outer end of each trailing edge being leading in the sense of direction of rotation of the saw blade in respect to the inner end of said trailing edge, the opposite faces of the blade having beveled surfaces extending along said back edges, the beveled surfaces of one face alternating circumferentially of the blade with the beveled surfaces of the other face, said beveled surfaces being progressively increased in width from the forward extremities thereof in a direction toward the rear ends of the beveled surfaces, for at least part of the length of the beveled surfaces.

2. A gullet-type circular saw blade of polygonal configuration having gullets alternating with straight back edges, each gullet having a trailing edge angular to the next following back edge and extending into convergence with the next following back edge, at the point of intersection of said next following back edge with a straight line drawn in extension of the next preceding back edge, each trailing edge being angular to a line intersecting the same and drawn radially from the center of the blade, the outer end of each trailing edge being leading in the sense of direction of rotation of the saw blade in respect to the inner end of said trailing edge, the opposite faces of the blade having beveled surfaces extending along said back edges, the beveled surfaces of one face alternating circumferentially of the blade wtih the beveled surfaces of the other face, said beveled surfaces being progressively increased in width from the forward extremities thereof in a direction toward the rear ends of the beveled surfaces, for at least part of the length of the beveled surfaces, the forward extremities of the beveled surfaces being spaced rearwardly along each back edge from the point of convergence of said back edge with the trailing edge of the gullet immediately preceding the beveled surface.

3. A gullet-type circular saw blade of polygonal configuration having gullets alternating with straight back edges, each gullet having a trailing edge angular to the next following back edge and extending into convergence with the next following back edge, at the point of intersection of said next following back edge with a straight line drawn in extension of the next preceding back edge, each trailing edge being angular to a line intersecting the same and drawn radially from the center of the blade, the outer end of each trailing edge being leading in the sense of direction of rotation of the saw blade in respect to the inner end of said trailing edge, the opposite faces of the blade having beveled surfaces extending along said back edges, the beveled surfaces of one face alternating circumferentially of the blade with the beveled surfaces of the other face, said beveled surfaces being progressively increased in width from the forward extremities thereof in a direction toward the rear ends of the beveled surfaces, for at least part of the length of the beveled surfaces, the forward extremities of the beveled surfaces being spaced rearwardly along each back edge from the point of convergence of said back edge with the trailing edge of the gullet immediately preceding the beveled surface, the portions of said back edges that extend between the forward extremities of the beveled surfaces and said points of convergence of the back edges with the trailing edges of the gullets immediately preceding the beveled surfaces, being formed as straight extensions of the portions of the back edges along which said beveled surfaces extend.

References Cited in the file of this patent

UNITED STATES PATENTS

| 202,668 | Schleicher | Apr. 23, 1878 |
| 1,059,069 | Redner | Apr. 15, 1913 |
| 1,061,459 | Duncan | May 13, 1913 |
| 2,644,494 | Lundberg | July 7, 1953 |

FOREIGN PATENTS

| 894,764 | Germany | Oct. 28, 1953 |
| 895,517 | Germany | Nov. 26, 1953 |